United States Patent
Robinson

(10) Patent No.: US 11,233,801 B1
(45) Date of Patent: Jan. 25, 2022

(54) SESSION PROTOCOL UPDATE OR UPGRADE WEB TRAFFIC

(71) Applicant: Netskope, Inc., Santa Clara, CA (US)

(72) Inventor: James S. Robinson, Indianapolis, IN (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/331,516

(22) Filed: May 26, 2021

(51) Int. Cl.
*H04L 29/06* (2006.01)
*H04L 29/08* (2006.01)

(52) U.S. Cl.
CPC ........ *H04L 63/102* (2013.01); *H04L 63/0435* (2013.01); *H04L 63/20* (2013.01); *H04L 67/141* (2013.01); *H04L 67/2804* (2013.01)

(58) Field of Classification Search
CPC ... H04L 63/102; H04L 63/0435; H04L 63/20; H04L 63/0478; H04L 63/164; H04L 63/1408
USPC .......................................................... 726/1
See application file for complete search history.

(56) References Cited

U.S. PATENT DOCUMENTS

| | | | |
|---|---|---|---|
| 9,077,754 B2 | 7/2015 | Gonuguntla | |
| 9,172,545 B2 | 10/2015 | Edstrom | |
| 9,203,627 B2 | 12/2015 | Edstrom | |
| 9,253,193 B2 | 2/2016 | Udupa | |
| 9,306,933 B2 | 4/2016 | Pontillo | |
| 9,584,484 B2 | 2/2017 | Frost | |
| 10,091,239 B2 | 10/2018 | Ylonen | |
| 10,382,490 B2 | 8/2019 | Kassimis | |
| 10,412,067 B2 | 9/2019 | Ayyadevara | |
| 10,491,638 B2 | 11/2019 | Narayanaswamy | |
| 10,819,749 B2 | 10/2020 | Ithal et al. | |
| 11,019,106 B1 | 5/2021 | Harvell | |
| 2008/0263215 A1 | 10/2008 | Schnellbaecher | |
| 2009/0327695 A1 | 12/2009 | Molsberry | |
| 2013/0005299 A1* | 1/2013 | Raleigh | G06Q 40/00 455/406 |
| 2014/0196108 A1 | 7/2014 | Barr | |

(Continued)

FOREIGN PATENT DOCUMENTS

| | | |
|---|---|---|
| CN | 107040508 | 8/2017 |
| KR | 102050188 | 11/2019 |

(Continued)

*Primary Examiner* — Longbit Chai
(74) *Attorney, Agent, or Firm* — Kilpatrick Townsend & Stockton, LLP

(57) ABSTRACT

A policy-controlled communication system including a plurality of client devices establishing a secure session with remote instances on a web server using a protocol. The system includes a policy component with a set of policies customized based on parameters. The policies specify configuration settings of encryption protocols for content security on a client device. The parameters include connection, application, source, destination, data classification, type, user groups, encryption type, and/or performance. A local application selects a cloud service. A mid-link server includes a router to provision the set of policies, a security developer to determine an encryption link to deliver the cloud service to the client device and a linker to select a session protocol for establishing the secure session between the client device and the web server based on the set of policies. The router establishes via the encryption link the secure session based on the selected session protocol.

20 Claims, 7 Drawing Sheets

(56) References Cited

U.S. PATENT DOCUMENTS

| | | |
|---|---|---|
| 2014/0304498 A1 | 10/2014 | Gonuguntla |
| 2016/0006765 A1* | 1/2016 | Shem Tov ............. G06Q 10/06 726/1 |
| 2017/0374070 A1 | 12/2017 | Shah |
| 2018/0278651 A1 | 9/2018 | Narayanaswamy |
| 2019/0158540 A1 | 5/2019 | Mahaffey |
| 2020/0059426 A1 | 2/2020 | Raleigh |

FOREIGN PATENT DOCUMENTS

| | | |
|---|---|---|
| WO | WO2017210198 | 12/2017 |
| WO | WO2018136942 | 7/2018 |

* cited by examiner

SESSION PROTOCOL UPDATE OR UPGRADE WEB TRAFFIC

BACKGROUND

This disclosure relates in general to session protocol security and, but not by way of limitation, to policy-controlled negotiation of an encryption protocol for the security of communication session among other things.

Encrypted communication has been challenging for enterprises. The challenges in secrets management, encryption key negotiations, and the strength of the ciphers are some of them. Many enterprises have solutions that enforce encryption rules for ciphers and other encryption key negotiation mechanisms using group policy on managed endpoints. However, these solutions may not be able to be pushed to each user of a cloud service from unmanaged devices like mobile phones. Additionally, encryption protocols used in communication sessions become obsolete or deprecated over time which results in insecure communication links.

Weak communication links during a communication session between a client and a server pose threat to integrity of content being shared. The content might be easily hacked and/or altered resulting in compromised content. The compromised content accompanies considerable financial losses to the enterprises and insecurity among the employees in the enterprise. Further, merely relying on default encryption settings and trusting the established communication links does not improve the vulnerability of the communication session.

SUMMARY

In one embodiment, the present disclosure provides a policy-controlled communication system including a plurality of client devices establishing a secure session with remote instances on a web server using a protocol. The system includes a policy component with a set of policies customized based on parameters. The policies specify configuration settings of encryption protocols for content security on a client device. The parameters include connection, application, source, destination, data classification, type, user groups, encryption type, and/or performance. A local application selects a cloud service. A mid-link server includes a router to provision the set of policies, a security developer to determine an encryption link to deliver the cloud service to the client device and a linker to select a session protocol for establishing the secure session between the client device and the web server based on the set of policies. The router establishes via the encryption link the secure session based on the selected session protocol.

In an embodiment, a policy-controlled communication system is disclosed. The policy-controlled communication system including client devices establishing a secure session with remote instances on a web server using an encryption protocol. The policy-controlled communication system includes a policy component with a plurality of policies. A set of policies from the plurality of policies are customized for content security on a client device of a plurality of client devices. The set of policies are customized based on a set of parameters. The set of parameters include at least one of: configuration settings of encryption protocols, user connection, destination connection, user application, destination application, source, source location, destination, destination location, application type, data classification, data type, user groups, encryption type, performance, user's geographical location, protocol type, algorithm, threat, metadata, user and entity behavior analytics (UEBA) information, residency, and/or type of user connection. A local application of the policy-controlled communication system is configured to execute on the client device and select a cloud service from a plurality of cloud services. A mid-link server of the policy-controlled communication system is coupled to the client device. The mid-link server includes a router, a security developer and a linker. The router is configured to provision the set of policies for the secure session to the web server. The security developer is configured to determine an encryption link of a plurality of encryption links specified for the set of policies and the cloud service. The plurality of encryption links deliver the cloud service to the client device. The linker is configured to select a session protocol from a plurality of session protocols for establishing the secure session between the client device and the web server in accordance with the set of policies. The router is further configured to establish via the encryption link the secure session of the client device with the web server based on the selected session protocol.

In another embodiment, a method for policy-controlled negotiation of an encryption protocol for a secure session between a plurality of client devices and a web server in cloud-based multi-tenant systems is disclosed. In one step, a set of policies is customized for content on a client device of the plurality of client devices with a policy component having a plurality of policies. The set of policies from the plurality of policies are customized based on a set of parameters. The set of parameters include at least one of: configuration settings of encryption protocols, user connection, destination connection, user application, destination application, source, source location, destination, destination location, application type, data classification, data type, user groups, encryption type, performance, user's geographical location, protocol type, algorithm, threat, metadata, user and entity behavior analytics (UEBA) information, residency, and/or type of user connection. A cloud service is selected from a plurality of cloud services using a local application on the client device. On a mid-link server between the client device and the web server, the set of policies are provisioned. An encryption link is determined from a plurality of encryption links specified for the set of policies and the cloud service. The plurality of encryption links deliver the cloud service to the client device. A session protocol from a plurality of session protocols is selected for establishing the secure session between the client device and the web server in accordance with the set of policies. The secure session is established via the encryption link between the client device and the web server based on the selected session protocol.

In yet another embodiment, a policy controlled communication system with client devices establishing a secure session with remote instances on a web server using an encryption protocol is disclosed. The policy controlled communication system comprising a plurality of servers, collectively having code for:
customizing a set of policies for content security on a client device of a plurality of client devices with a policy component having a plurality of policies, wherein: the set of policies from the plurality of policies are customized based on a set of parameters, and the set of parameters include at least one of: user connection, destination connection, user application, destination application, source, source location, destination, destination location, application type, data classification, data type, user groups, encryption type, performance, user's geographical location, protocol type, algorithm, threat, metadata, user and entity behavior analytics (UEBA) information, residency, and/or type of user connection;

receiving from a local application running on the client device of the plurality of client devices, selection of a cloud service from a plurality of cloud services;

provisioning on a mid-link server between the client device and the web server, the set of policies;

determining an encryption link of a plurality of encryption links specified for the set of policies and the cloud service, wherein the plurality of encryption links deliver the cloud service to the client device;

selecting a session protocol from a plurality of session protocols for establishing the secure session between the client device and the web server in accordance with the set of policies; and establishing via the encryption link the secure session of the client device with the web server based on the selected session protocol.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
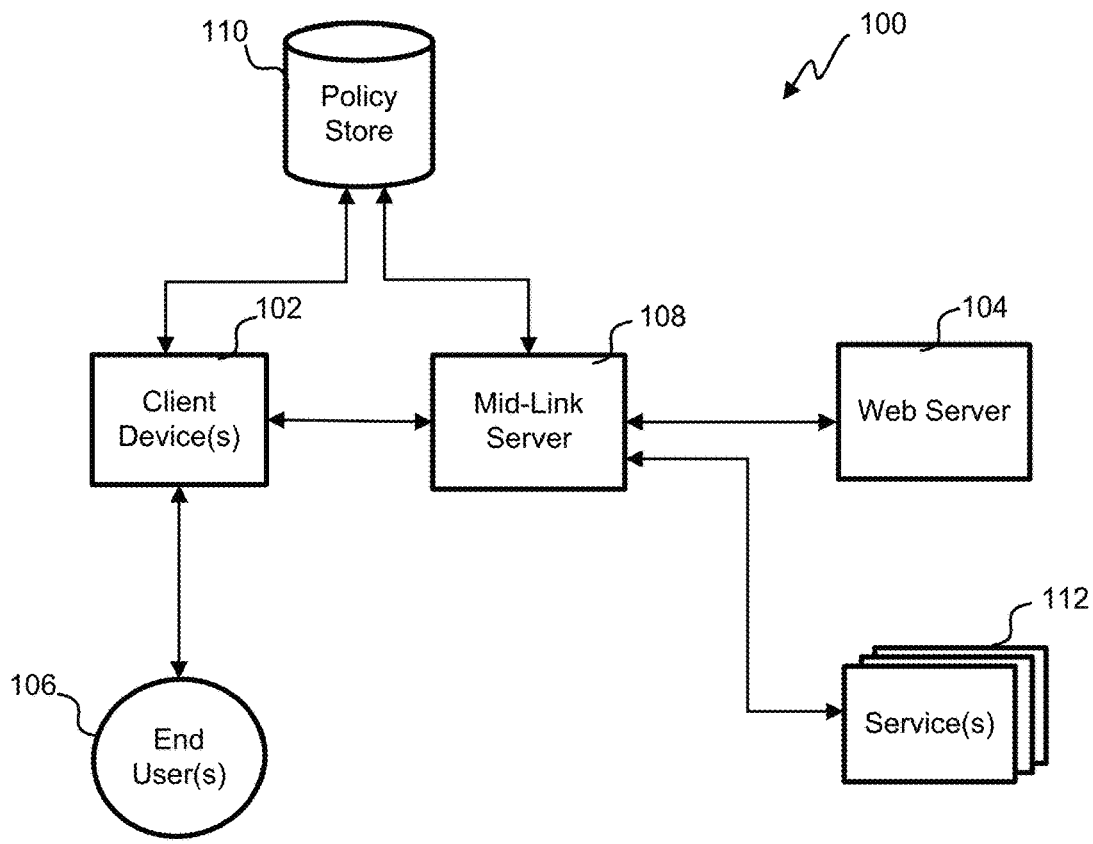
FIG. 1 illustrates a block diagram of an embodiment of a policy-controlled communication system.

Referring first to FIG. 1, a block diagram of an embodiment of a policy-controlled communication system 100 is shown. The policy-controlled communication system 100 includes client devices 102, a web server 104, end users 106, a mid-link server 108, a policy store 110, and services 112. The client device(s) 102 such as smartphones, tablets, PCs, and any other computers communicate with the web server 104 over encryption links using an internet. The client devices 102 may be secured by using the mid-link server 108 that remotely hosts the software environment that is secured. The client devices 102 run on any popular operating system (OS) such as Windows™, iOS™, Android™, Linux, set top box OSes such as Real-Time Operating System (RTOS), Unix OS, Linux-Kernel, and Linux OS in Internet of Things (IoT)/Industrial control systems (ICS)/Distributed Control Systems (DCS)/Operational Technology (OT), and Chromebook™. Third party apps are applications running on the operating system of the client devices 102. The policy store 110 holds policies for each client device 102 and the mid-link server 108.

The client devices 102 use content and processing from the web server 104 including content sites for example, web sites, streaming content, etc. and the services 112 for example, SaaS tools, databases, cloud service providers, etc. Under policy control, the client device 102 routes some interaction to the mid-link server 108 that hosts a controlled software environment for each end user 106 to securely interact with the web server 104 and the services 112 or enterprise tools in a way limited by specified policies. For example, policies may specify configuration settings of encryption protocols that are used for establishing secure connection between the client device 102 and the web server 104 while using the controlled software environment by remote access.

Policies control the manner in which the content is stored, processed, printed, stored, forwarded, emailed, or otherwise captured at the client device 102. Other policies may enable certain software or interaction on the client device 102 while physically on premise and allowing different software or interaction while working in the field or at home away from the enterprise premises. In one example policy on the client device, cut-and-paste to/from the remote software environment may be disabled for some or all applications when accessed from the client device 102 on a specific encryption link to the web server 104. In some cases, enforcement of the policy depends on whether the client device 102 is within the enterprise or away from the office. The encryption link provide communication along a network in encrypted manner. The encryption link uses protocols for establishing secure links between the client devices 102 and the content sites of the web server 104. For example, Secure Sockets Layer (SSL) and its successor, Transport Layer Security (TLS), Hypertext Transfer Protocol (HTTP), Hypertext Transfer Protocol Secure (HTTPS), or any other encryption protocols are used for establishing authenticated and encrypted links between the client devices 102 and the web server 104. An example of the policies is illustrated in Table 1 discussed below.

Table 1 below illustrates a list of policies, a list of parameters, and corresponding connection links stored in the policy store 110.

TABLE 1

| Policies | Parameters | Connections |
| --- | --- | --- |
| Policy 1 | User Connection | SSL3.0/TLS 1.1/TLS 1.2/HTTP 2.0 connection |
| Policy 2 | Destination Connection | TLS 1.2/HTTPS connection |
| Policy 3 | Source, Source Location | TLS 1.1, TLS 1.2 connection |
| Policy 4 | Destination, Destination Location | TLS 1.3 connection |
| Policy 5 | User Application | SSL 3.0/TLS 1.1/TLS1.2/TLS 1.3 connection |
| Policy 6 | Destination Application | TLS 1.3/TLS 1.3 PFS connection |
| Policy 7 | Data Classification: secret, confidential, encrypted | TLS 1.3 connection |
| Policy 8 | Data Type: text/html, video/mpeg, image/png, text/css, audio/basic | TLS 1.1/TLS 1.2 connection |
| Policy 9 | User groups | TLS 1.2/HTTP 1.0/1.1/1.2/2/0 connection |
| Policy 10 | Encryption Type: AES, DES, RSA | TLS 1.3 connection |
| Policy 11 | Performance Parameters: latency, bandwidth, throughput | TLS 1.2/TLS 1.3 connection |

As illustrated in Table 1, the policies are specified with respective parameters and connections. For example, Policy 1 is associated with user connection at the client device 102 which has respective SSL 3.0/TLS 1.1/TLS 1.2/HTTP 2.0 connections. That is based on the user connection the policy requires a connection when the encryption protocols of the encryption links are one of SSL 3.0, TLS 1.1, TLS 1.2, or HTTP 2.0 connections else connection is established through a secure tunnel comprising HTTP or HTTPS connection. HTTP 2.0 connection is used when other connections like SSL 3.0/TLS 1.1/TLS 1.2 are not available. In such situations, HTTP 2.0 connection is used. In another embodiment, when the connections are not met at the encryption links, an alert may be notified to an administrator or the end user 106 of the client device 102 that the encryption link does not meet the policy 1 and therefore, connection is unable to be established or the secure tunnel is used.

The web server 104 includes the content sites such as web sites, streaming content, etc. in order to provide content to the client devices 102. The web server 104 also allows the end users 106 of the client devices 102 to upload and download content from the content sites. The web server 104 is in communication with the client devices 102 through the mid-link server 108 over the internet. In another embodiment, the policy-controlled communication system 100 includes one or more application servers (not shown) for providing dynamic content to the client devices 102.

The mid-link server 108 for the work systems resides as a "man-in-the-middle" intentionally take over some or all: processing, application execution and/or content sites at the web server 104 and the services 112 interaction. The remote software environment is hosted by the mid-link server 108 for a policy-controlled experience using the policy store 110 for direction. For example, the content sites at the web server 104 can have certain features disabled, filtered or modified by the mid-link server 108 so that the client devices 102 behaves than if it were to directly connect to the content sites of the web server 104. For example, a policy may specify connection using Transport Layer Security (TLS) 1.3 session links.

Some embodiments have policies that selectively direct traffic to the mid-link server 108 based on a label or tag of the content. A classifier may identify the label or the tag of the content. For example, the content may be classified as confidential, encrypted, restricted, public or any other type associated with the content. For example, a secret document, encrypted file, or zipped folder is being transmitted by the client device 102 to the content site of the web server 104. By way of another example, a file labelled as "secret" that is the secret document may be shared from the client device 102 on a TLS 1.3 perfect forward secrecy (PFS) encryption link. If the encryption link does not meet the policy requiring TLS 1.3 PFS encryption link, the document is not shared from the client device 102 and the connection is established to the content site of the web server 104 via the secure tunnel including HTTP/HTTPS connection. In another embodiment, a policy may be established for allowed usage based on established security protocols.

The policy store 110 is a database that includes predefined policies for the content sharing. The policy store 110 also includes parameters associated with the policies. The parameters include a user connection, content type, a destination application, data classification, a data type, user groups, tags, encryption type, application type, user's geographical location, protocol type, algorithm, threat, metadata, user and entity behavior analytics (UEBA) information, residency, and/or type of user connection, and/or performance. Performance parameters include latency, bandwidth, or throughput. The policies are defined based on the parameters. For example, a policy for an end user A in department XYZ of the enterprise restricts the communication from the client device 102 on TLS 1.2 encryption links. Further, the end user A is barred from sending files labelled as "secret" and "confidential" to unauthenticated users outside of the enterprise network.

In an embodiment, the policy-controlled communication system 100 allows multiple-tenants in different domains to communicate with the web server 104 over the internet. The policy-controlled communication system 100 allows multiple tenants or enterprises (not shown) to all use the same network separated by domain or some other logical separation. Encryption, leased/encrypted tunnels, firewalls, and/or gateways can be used to keep the data from one enterprise separate from other enterprises. Each client device 102 can communicate with the web server 104 for services and storage using the internet. The mid-link server 104 provides multi-tenancy control, policies and routing for each domain.

Figure 2:
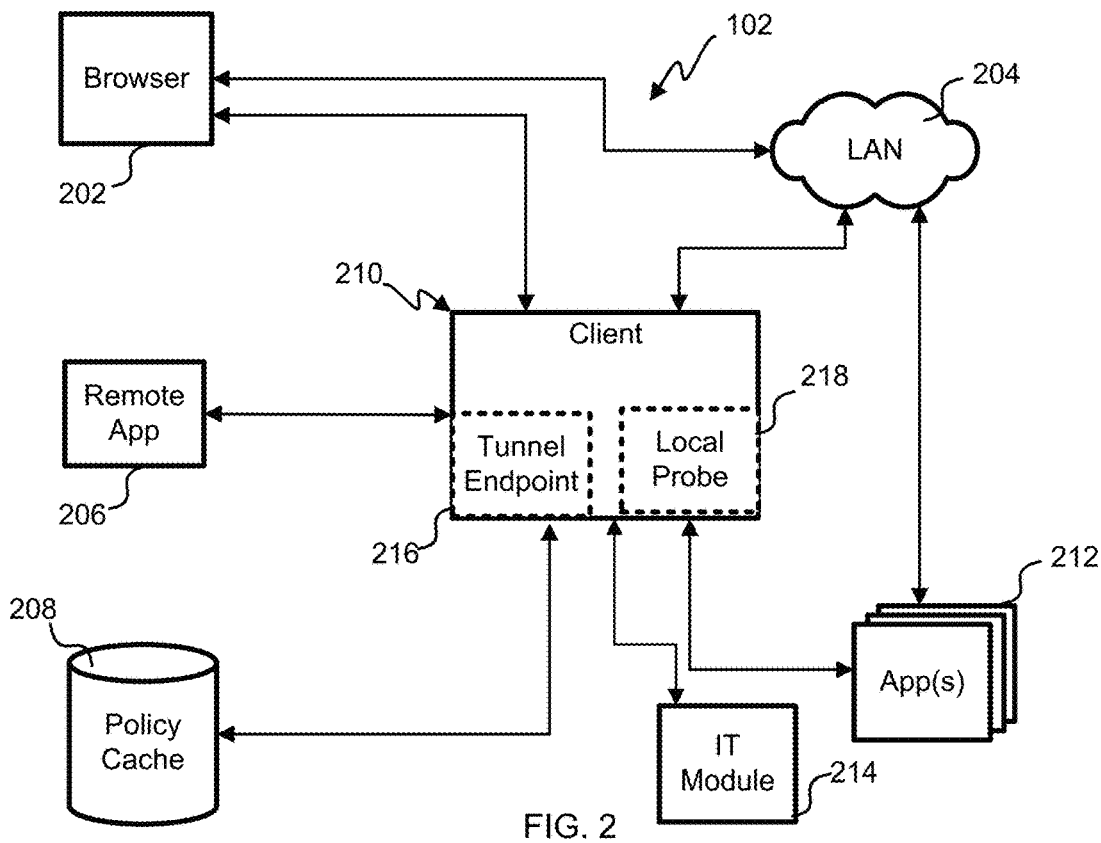
FIG. 2 illustrates a block diagram of an embodiment of a client device uses a client to establish connections with a mid-link server.

Referring specifically to FIG. 2, this embodiment of the client device 102 uses a client 210 to establish connections with the mid-link server 108. A remote app 206 exclusively uses the client 210 to communicate with the mid-link server 108 to maintain security for operation of the remote app 206. An endpoint tunnel 216 digitally segregates the traffic using protocols and/or encryption to avoid interception over the Local Area Network (LAN) 204 and Internet. Certain embodiments could use the SSL/TLS and/or HTTPS or a VPN to secure the endpoint tunnel 216.

Display of the remote software environment is performed by the remote app 206. The whole interface of the remote software environment could be displayed or the interface of a single remote app could be displayed. Several instances of the remote app 206 could display several remote app interfaces respectively. Multiple instances of the remote app 206 could have several remote software environments respectively running. For example, a user of Chromebook™ may have one remote app 206 running iOS™ and another remote app 206 running Linux™ with the ability to switch backand-forth in full-screen or windowed mode. The remote app 206 is a browser or a video player in some embodiments merely displaying a stream of video and gathering information with a local probe 218 to provide information for the remote software environment.

The local probe 218 in the client 210 gathers information of the client device 102, such as a user input (keyboard, mouse, touch screen, touchpad, gestures, haptic feedback, etc.), sensor information (trilateration location, compass, gyro, accelerometer, ambient light, video, camera, 3D movement detection, sound, sound arrays, temperature, etc.), and software environment (clock set time, time zone, installed or running apps 212, power status, battery status, app permissions, app settings, etc.). The local probe 218 gathers every information possible by the particular OS, computer hardware, OSI layer, or elsewhere to allow mimicry of those conditions at the software environment hosted on the mid-link server 108 for the client device 102. For example, the video camera on a phone client device 102 could be used by the software environment running iOS to participate in a video conference even when the user device 116 cannot natively support that video conference software.

The client 210 can apply policies that are stored locally in a policy cache 208 to the client device 102. The policy cache 208 is populated with policies from the policy store 110 that are relevant for the respective client device 102. As conditions change, the policies that are in effect could also change. For example, the camera/video sensors on the phone client device 102 could be disabled inside the office or factory, but re-enabled outside of a geofenced area. Certain features, functions or applications might be disabled by policy until certain conditions exist. For example, there may be a policy that: requires a recent anti-virus scan before establishing a connection to the LAN 204 on a TLS 1.2 encryption link, disables certain programs to be installed, and/or prevents emails to certain address(es), etc. from the client device 102.

This embodiment includes the endpoint tunnel 216 in the client 210. The endpoint tunnel 216 digitally separates packet traffic between the client device 102 and the mid-link server 108. There may be a number of endpoint tunnels 216 in operation simultaneously to support the remote app 206, any apps 212 or a browser 202 in communication with the mid-link server 108. A virtual private network (VPN) connection, HTTPS connection, and/or public or private key encryption, or TLS encryption can be used for the endpoint tunnel 216 for different connections.

An Information Technology (IT) module 214 provides an interface for an administrator or IT staff for analyzing log reports and assigning policies to the client devices 102. The administrator of the enterprise reviews the policies, established connections, and the encryptions links. The administrator may also modify the policies by updating and/or upgrading the policies using the IT module 214.

Figure 3A:
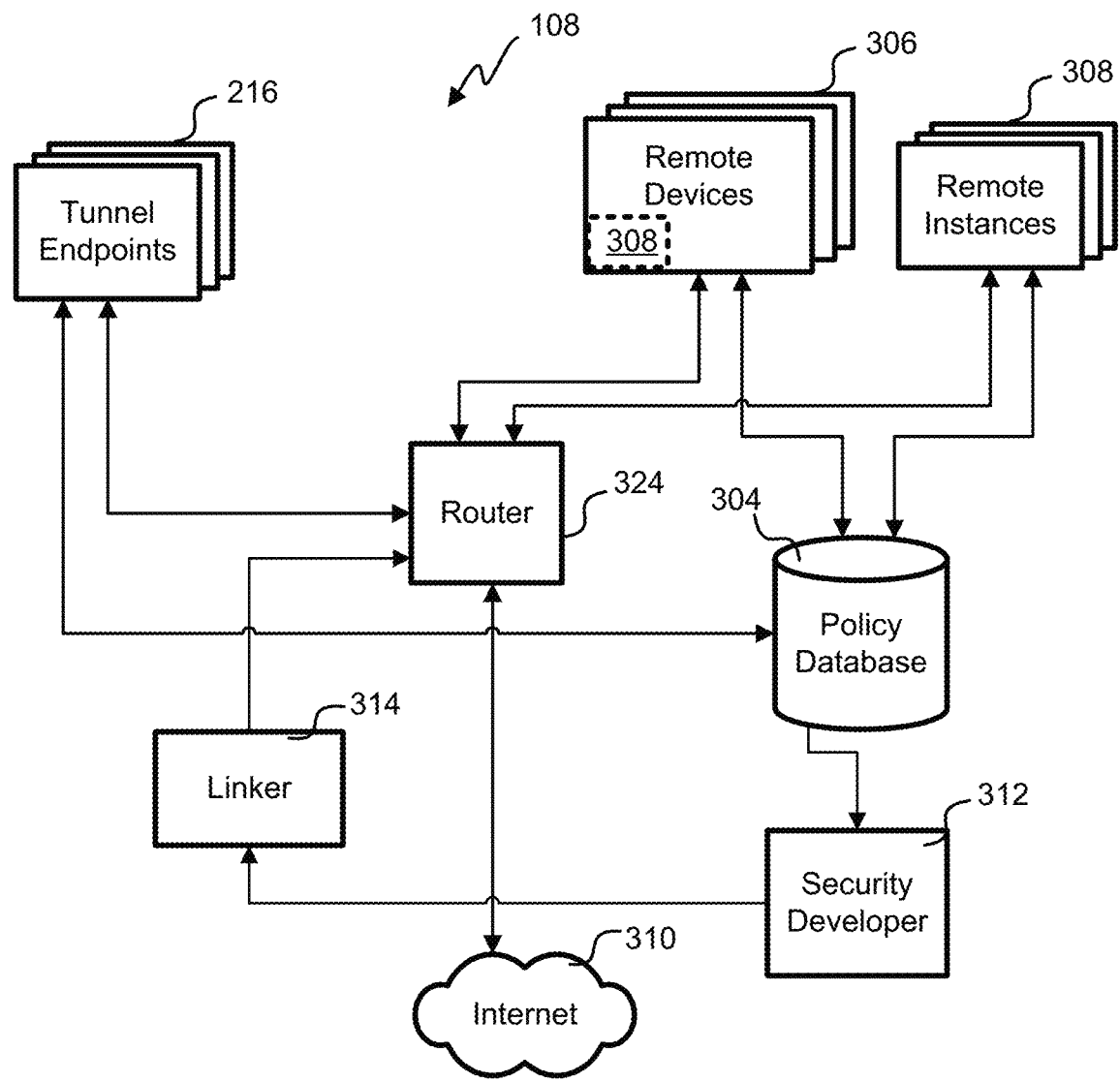
FIG. 3A illustrates a block diagram of an embodiment of a mid-link server that hosts software environments that client devices remote into.

Referring next to FIG. 3A, an embodiment of the mid-link server 108 is shown that hosts software environments that the client devices 102 remote into. Traffic is passed with an Internet 310 accessed through a router 324 to enable the various depicted components of the mid-link server 108 to communicate with each other, specifically, tunnel endpoints 216, a policy database 304, remote devices 306, remote instances 308, a security developer 312, and a linker 314.

The mid-link server 108 hosts many different enterprises and domains keeping usage from their different client devices 102 separated. In other cases, the mid-link server 108 could be dedicated to a particular enterprise and hosted inside their network or the LAN 204 or with a third party hosting service. In any event, each remote instance 308 is dedicated to a client device 102 for use, although information technology (IT) staff have access to update software, apply policies, make configuration changes, modify admin settings and rights, etc. to maintain the remote instance 308. The tunnel endpoints 216 connect with client devices 102 over the Internet 310 in digitally segregated connections.

Both physical remote devices 306 and virtual-machine remote instances 308 are supported to run software environments. For example, the physical remote devices 306 may be tablets, smartphones, personal computers (Mac or PC), Chromebooks™, Linux™ servers, kiosks, or any personal computing device that employees might use. Any operating system running in a virtual machine on a physical device is supported to enable any enterprise to have their software environments running in a secure, controlled and potentially high performance instantiations. The remote instances 308 host content sites, websites or streaming content for the client devices 102.

The remote devices 306 are physical hardware that hosts a remote instance 308 and is dedicated to the client device 102 currently connected to the mid-link server 108. Not all operating systems enable running in a development mode or as a virtual machine to support all the functionality of the remote instance 308. For those situations, the operating system is running on a physical device temporarily dedicated to the client device 102 with software to enable the end user 106 to control the remote instance 308.

The policy database 304 includes a list of policies for setting up connection between the client device 102 and the remote instances 308. The policy database 304 also includes a list of parameters based on which the connection with the remote instances 308 is established. The content to be shared and the connection to be established is matched within the list of parameters and their corresponding policies for establishing the connection. By way of an example, an encrypted content to be uploaded to a content site requires TLS 1.2 connection to be established at the remote instance 308. Here, in this example, parameter is data type—encrypted document and the corresponding policy associated with the data type—encrypted is TLS 1.2 connection. In other embodiments, encryption keys, encryption protocols, quality of service, authentication requirements, performance parameters for the client devices 102, and/or other requirements for the client devices 102 are included in the list of parameters. By way of another example, the tunnel endpoint 216 may not connect with the client devices 102 that have a modified HTTP stack that wouldn't have the same level of trust as one built into the operating system and a connection other than TLS 1.3 will result in a connection through HTTP/HTTPS. The policy database 304 is distributed from the policy store 110 and updated for each client device 102, their enterprise, their country, current location of the client device 102, etc.

The security developer 312 retrieves the policies corresponding to the parameters of the content and identifies the connection to be established. For example, if the content to be shared is of an encrypted type, a policy that requires only TLS 1.3 connection be established. The security developer 312 identifies the policies from the policy database 304 and provides it to the linker 314 for establishing the connection.

The linker 314 inspects the connection corresponding to the policy received from the security developer 312 at the web server 104. The linker 314 establishes connection through the router 324 to the remote instances 308 for the client device 102. For example, the linker 314 receives the policy requiring connection to only TLS 1.3 connection. The linker 314 inspects the connections and identifies the TLS 1.3 connection using which connection is to be established. The linker 314 establishes the TLS 1.3 connection using the router 324 to the corresponding remote instance 308.

Figure 3B:
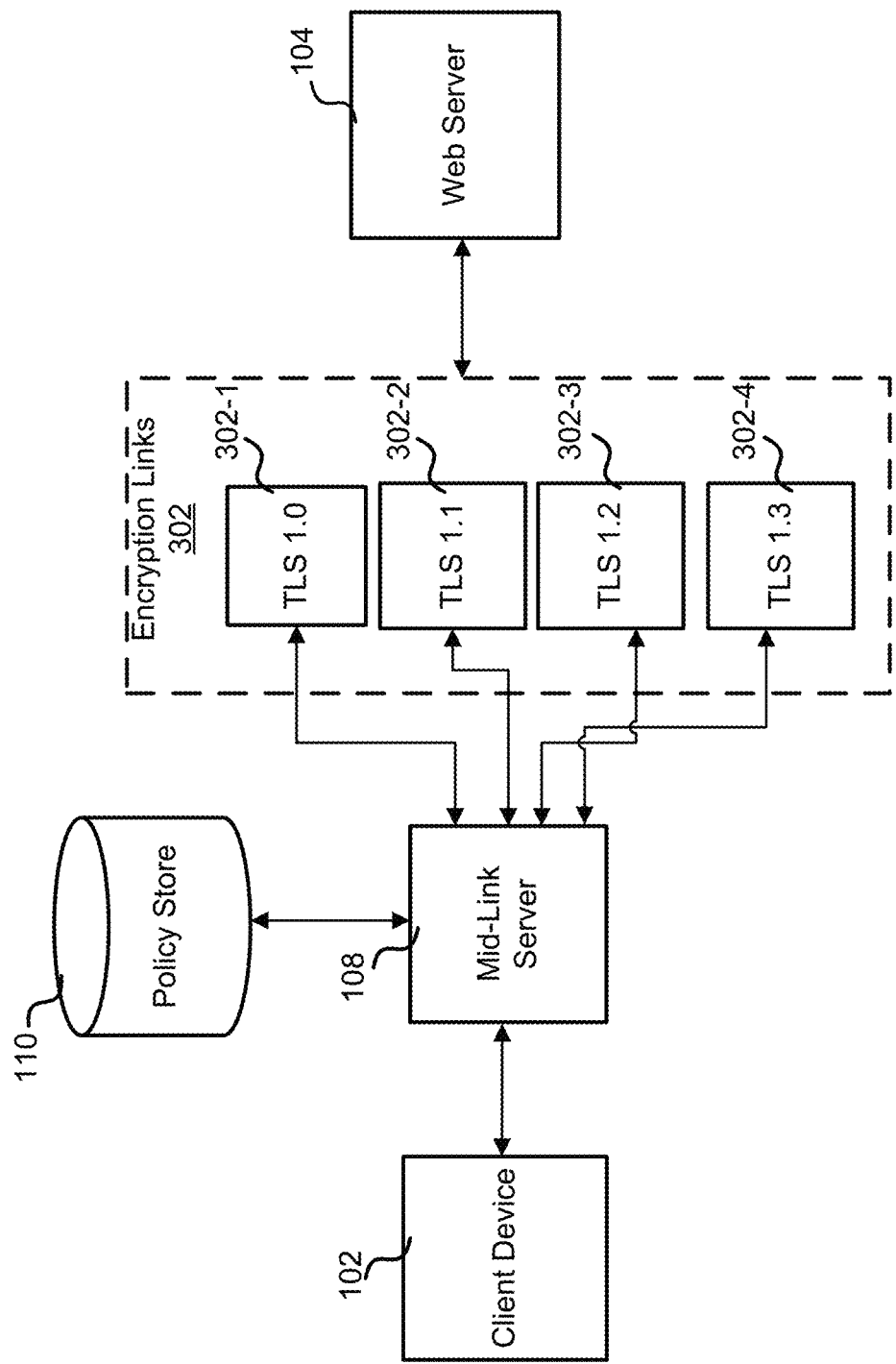
FIG. 3B illustrates a block diagram of an embodiment of a mid-link server where encryption links are used for secure connection between a client device and a web server in accordance with a set of policies.

Referring next to FIG. 3B, an embodiment of the mid-link server 108 is shown where encryption links 302 are used for secure connection between the client device 102 and the web server 104 in accordance with a set of policies. Policies exist at different stages of connection between the client device 102 and the web server 104. The mid-link server 108 facilitates the connection between the client device 102 and the web server 104. The policies enforced at the client device 102 are referred to as a first mile, the policies inspected at the mid-link server 108 are referred as a middle mile, and the policies enforced at the web server 104 are referred as the last mile.

An administrator or IT staff of an enterprise has control over the policies at the first mile that is at the client device 102. The administrator enforces the policies at the client device 102 based on a user group, business unit, user profile, user device, remote working, and/or geolocation. The policies are associated with the connections that are used to be established in order to communicate with the web server 104. For example, a policy requires a TLS 1.3 connection to communicate.

The mid-link server 108 performs check at the web server 104 of the connections corresponding to the policies. The mid-link server 108 performs inspection at the middle mile using the policies from the list of policies stored in the policy store 110. The mid-link server 108 controls web traffic for establishing the connection between the client device 102 and the web server 104. If the mid-link server 108 determines that the connections to the web server 104 are in nonconformity with the policies, either no connection is established or a connection using the secure tunnel is established with the web server 108. The determination may be based on machine learning algorithms. However, if the mid-link server determines that the connection is in accordance with the policies, then a secure connection is established by the mid-link server 108. The policies specify the secure tunnel for the encryption links of the client devices 102 connecting to the web server 104 that do not meet common security standards such as TLS or SSL but still need secure web access. The secure tunnel would connect the client device 102 to the mid-link server 108 and would be configurable. For example, HTTP over HTTPS tunneling which provides the secure tunnel for communication.

At the web server 104, the last mile policies are checked to establish the connection. For example, the web server 104 checks for the policies provided by the mid-link server 108 and provides the response to the mid-link server 108. If the connections are in accordance with the policies for example, TLS 1.3 connection, the connection is established with the client device 102 through the mid-link server 108. The connections between the middle mile and the last mile are encryption links 302. The various encryption links available with the web server 104 may be TLS 1.0 link 302-1, TLS 1.1 link 302-2, TLS 1.2 link 302-3, and TLS 1.3 link 302-4. Among these encryption links 302, one of the encryption links 302 that are in accordance with the policies are used to connect with the client device 102.

Figure 4:
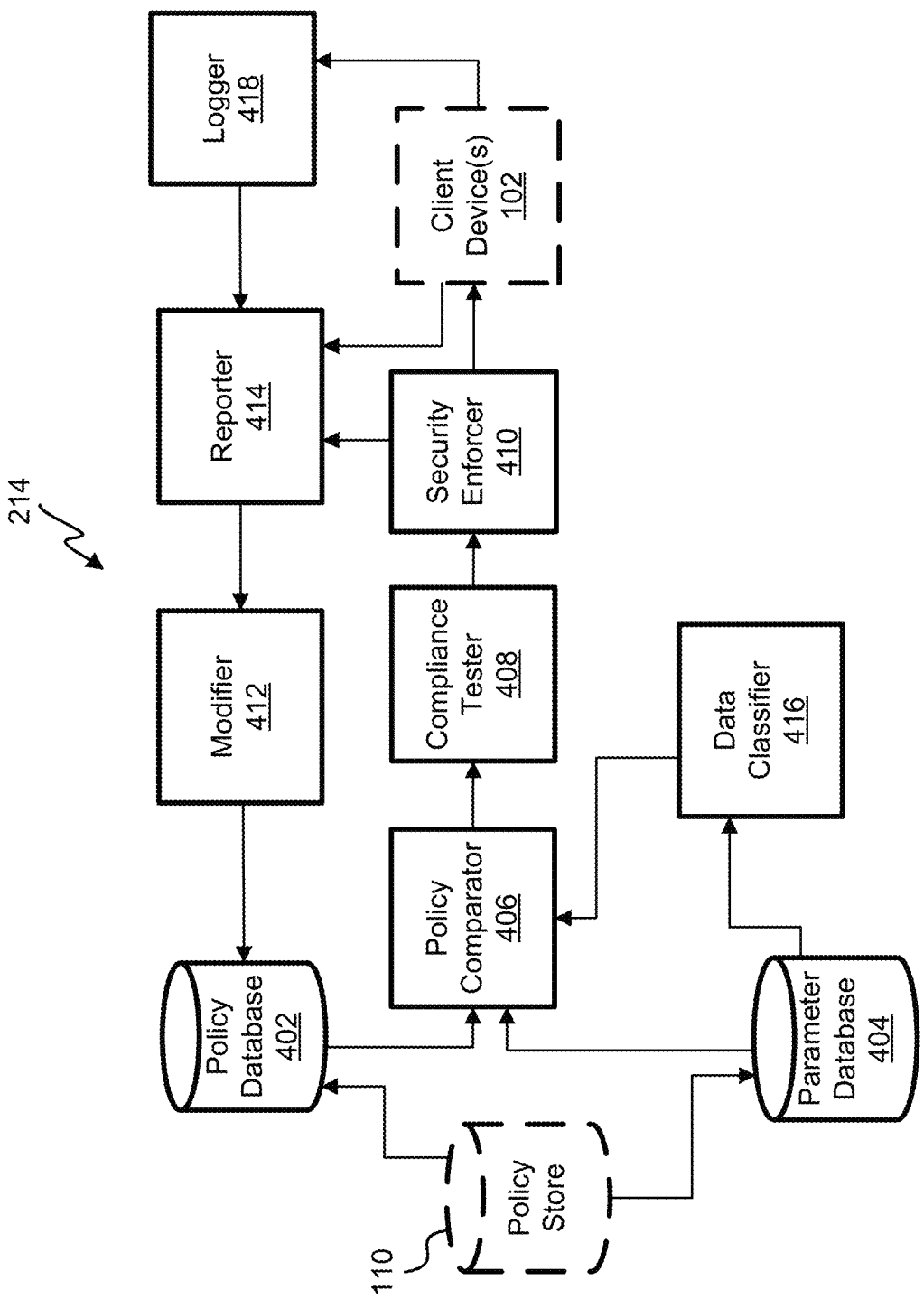
FIG. 4 illustrates a block diagram of an embodiment of an Information Technology (IT) module configured to enforce policies on a client device and review log reports of established connections between the client device and a web server.

Referring to FIG. 4, an embodiment of an Information Technology (IT) module 214 configured to enforce policies on the client device 102 and review log reports of established connections between the client device 102 and the web server 104. The IT module 214 includes a policy database 402, a parameter database 404, a policy comparator 406, a compliance tester 408, a security enforcer 410, a modifier 412, a reporter 414, a data classifier 416, and a logger 418.

The policy database 402 and the parameter database 404 have stored policies and parameters from the policy store 110, respectively. For each request from the client device 102 to initiate a connection to the web server 104, the policy comparator 406 matches the policies from the policy database 402 with the parameters from the parameter database 404 based on the client device 102, a type of connection, a service type, and a type of content of the request. The policy database 402 includes a list of policies with the corresponding parameters and connection types. The parameter database 404 includes parameters corresponding to the client device 102, the type of connection, the service type, and the type of content of the request.

The policy database 402 and the parameter database 404 also includes respective threshold values. Based on the request from the client device 102, the parameters are determined from the parameter database 404. The determined parameters are compared within the parameters from the policy database 402. The corresponding policies and connections are determined from the match. The threshold values of the policies and the parameters are also compared. For example, a policy threshold value of SSL or TLS 1.0 connection or TLS connections higher than the TLS 1.0. A parameter threshold value of type of content—secure or confidential and type of encryption such as AES. Meeting the policy and the parameter threshold values provides options for connection.

Further, the policy comparator 406 extracts tags of content to be shared from the client device 102 to content sites or websites of the web server 104. For example, Data Loss Prevention (DLP) techniques may be used to read the tags. The tags are extracted by the data classifier 416. The data classifier 416 identifies a tag having a header and a metadata of the content and provides it to the policy comparator 406. For example, the content may be classified by tagging as confidential, encrypted, restricted, public or any other type of tag may be associated with the content.

The policy comparator 406 uses the tag as one of the parameters for comparison with the parameters in the policy database 402. The policy and connections are determined based on the parameters matched with the policies in the policy database 402. The determined policies are provided to the compliance tester 408 for verification.

The compliance tester 408 verifies the received policies in accordance with government regulations of the geographical location. The policies are checked for any kind of violation of the government rules and regulations. In case the policies are in violation of the government regulations or are in compliance with the government regulations, an indication is sent to the security enforcer 410 for further actions.

The security enforcer 410 enforces the policies on the client device 102 based on the indication received from the compliance tester 408 when the policies are in compliance with the government regulations. In case the policies are in violation of the government regulations, an alert if displayed to the administrator on the reporter 414 and the client device 102 so that the administrator and/or the end user 106 may take action regarding the issue.

The logger 418 is a repository of log reports of past and current connections of the client device 102. The logger also stores historical log reports of policies implemented on the client device 102. The logger continuously monitors the connections of the client device 102 and gathers log data from the client device 102. The log reports are provided to the reporter 414 for further analysis.

The reporter 414 is a display device coupled with a processor and a memory to facilitate the administrator to analyze the log reports of the past and current connections of the client device 102 obtained from the logger 418. Security of the connections, violations of the standards and performance parameters are analyzed by the administrator using the display device. The reporter 414 also indicates alerts regarding violations of the policies from the government regulations so that the administrator may perform certain actions with respect to the violations. The analyzed data is provided to the modifier 412 for further processing.

The modifier 412 processes the analyzed data from the reporter 414 to modify the policies if required. For example, the client device 102 may be enforced with updated policies and connections. TLS connections or any other kind of connections are updated and/or upgraded from time to time. Accordingly, the policies also update and the list of policies in the policy database 402. Further, parameters also change, user profiles and client devices 102 may also update, accordingly the parameters and their policies are updated. Based on a history of established connections, client devices 102, content types and the destinations at the web server 104, the policies may be modified and implemented. The administrator provides approval to the modified policies after which the policies are stored in the policy database 402 for implementation.

Figure 5:
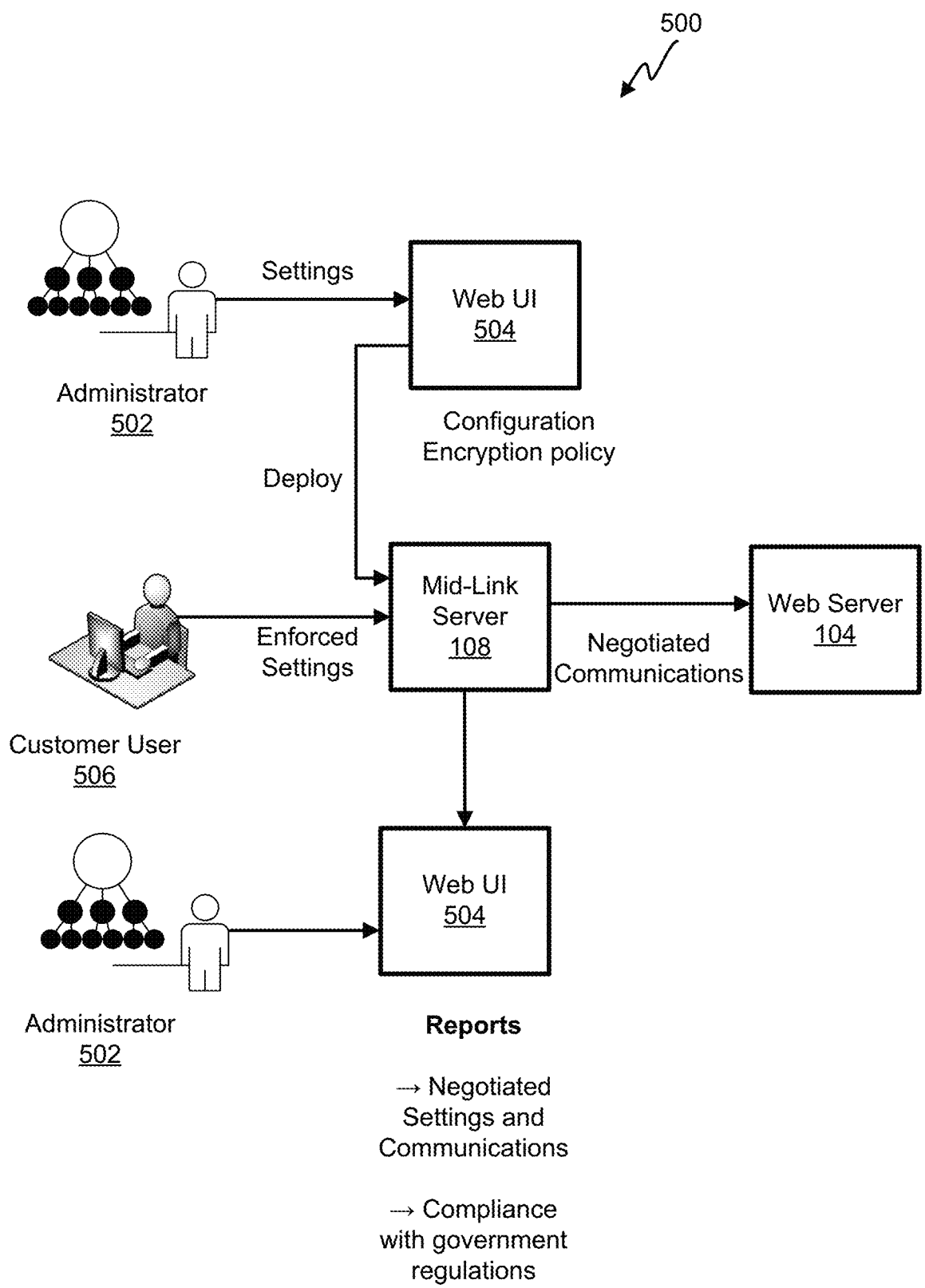
FIG. 5 illustrates a flow diagram of an embodiment of a policy-controlled communication system where policies are deployed at a client device 102 by an administrator of an enterprise.

Referring to FIG. 5, a flow diagram of an embodiment of the policy-controlled communication system 100 is shown where policies are deployed at the client device 102 by an administrator of an enterprise.

An administrator 502 uses a display device with a web user interface (UI) 504 to enforce configuration settings for policies at the client device 102. A customer user 506 of the client device 102 is able to share content with the web server 104 based on the enforced policies. The policies are further deployed by the administrator 502 on the mid-link server 108. The mid-link server 108 becomes aware of the policies and establishes communication with the web server 104 based on the policies.

The mid-link server 108 negotiates with the web server 104 according to the policies and establishes connection when the web server 104 complies with the policies. For example, a policy requires TLS 1.3 PFS connection, in this case the mid-link server 108 establishes connection with the TLS 1.3 PFS connection else the connection is not established and an alert may be generated to the administrator 502 for performing an action.

The administrator 502 analyzes log reports of the connections and policies. The administrator also receives the alerts from the mid-link server 108 regarding non-compliance with the policies. In such situations, the administrator may modify the policies such that the connection is established or may instruct the mid-link server 108 to establish the connection via the secure tunnel or HTTP/HTTPS connections. A threshold value for each of the policies may also be defined by the administrator 502 or may be predefined by a third party which may help establish secure connections. For example, in case a TLS 1.3 connection is available and the content to be shared is not confidential, the administrator 502 may modify the policies with TLS 1.3 PFS to also include TLS 1.3 connection. The threshold value being the parameter—type of content—not confidential. According to the modified policies and the threshold value, the mid-link server 108 may establish the connection.

The negotiated configuration settings, the established connections and the communications are analyzed by the administrator 502 through the log reports. Analysis of links, and checking compliance with government regulations are other functions performed by the administrator 502 using the log reports of the connections.

Figure 6:
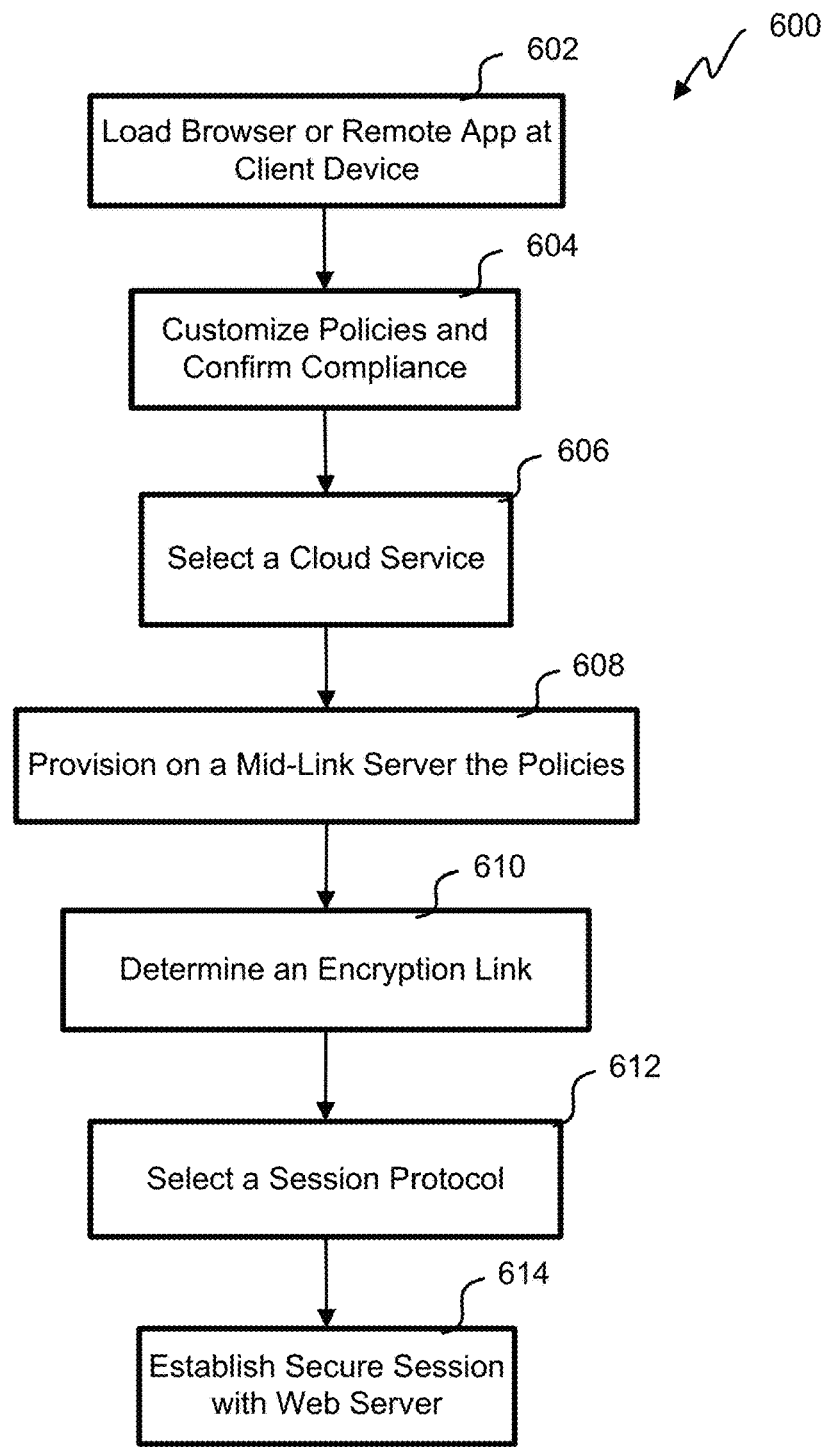
FIG. 6 illustrates a flowchart of an embodiment of a policy controlled connection process for a client device.

Referring next to FIG. 6, a flowchart of an embodiment of a policy controlled connection process 600 for a client device 102 is shown. The depicted portion of the process begins at block 602 where a user of the client device 102 loads browser or a remote application at the client device 102. The user desires to access a content site or upload a document to another site of the web server 104 at a first mile. The user initiates the request for connection to the web server 104 to the mid-link server 108. The mid-link server 108 acts as an intermediate server controlling the connection at a middle mile based on a set of policies. The web server 104 provides connection at a last mile.

At block 604, an administrator of an enterprise of the user of the client device 102 enforces the set of policies at the client device 102. The policies are enforced based on a set of parameters including a user connection, a destination application, data classification, data type, content type, user groups, tags, application type, encryption type, user's geographical location, user and entity behavior analytics (UEBA) information, user residency, and/or type of user connection, and/or performance. The administrator confirms compliance of the policies with government regulations.

At block 606, the user of the client device 102 selects a cloud service for access, the cloud service being accessed from the web server 104. The cloud service may be downloading or browsing content from a website, streaming content from the website or uploading or sharing content to the website or remote instances of the web server 104.

At block 608, the request for accessing the cloud service is made to the mid-link server 108 by the client device 102. The mid-link server 108 checks the policies enforced at the client device 102 and compares them with the policies at the web server 104.

At block 610, if the web server 104 is able to provide a connection in accordance with the policies, then the mid-link server 108 initiates the connection using an encryption link determined based on the policies else the connection is not initiated. An alert is provided to the administrator in this case for further action.

At block 612, a session protocol is established in accordance with the encryption link and the policies. For example, TLS 1.3 connection protocol, TLS 1.2 connection protocol etc. Machine learning algorithms may be set to select the most secure connection protocol in accordance with the encryption link and the policies. For example, TLS 1.3 connection may still be insecure if there exists an upgraded TLS connection. In such situations, the machine learning algorithms determine the most secure session protocol. If the TLS 1.3 or TLS 1.2 connection is not available, the machine learning algorithms determine HTTP or HTTPS session protocol for connection.

At block 614, a secure connection or a secure session is established with the web server 104 in accordance with the policies. Based on the established connection, the client device 102 communicates with the web server 104. The secure session may also be established based on modified policies when the alert is generated. The alert indicates that the policies at the web server 104 do not meet the policy requirements of the client device 102 and also does not satisfy a policy threshold and/or a parameter threshold value associated with the policies. The administrator may modify the policies at the client device 102 as a remedial action to the alert. The administrator may also indicate not to establish the session based on non-compliance with the policies or establish connections using the secure tunnel.

Figure 7:
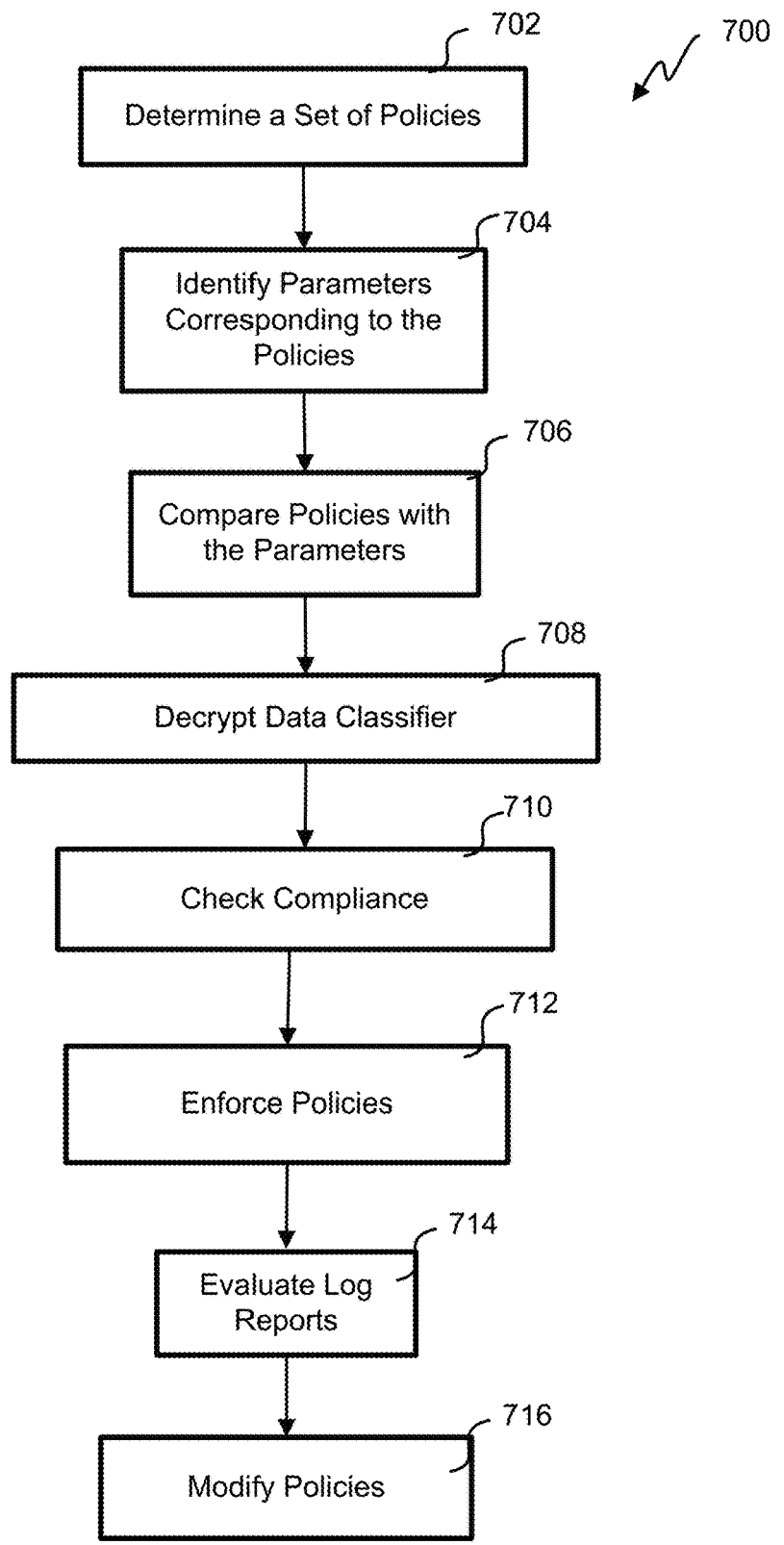
FIG. 7 illustrates a flowchart of an embodiment of a policy enforcement process for a client device.

Referring next to FIG. 7, a flowchart of an embodiment of a policy enforcement process 700 for a client device 102 is shown. The depicted portion of the process begins in block 702 where an administrator of an enterprise determines a set of policies for each of the client devices 102 of the enterprise. One or more of the client devices 102 may desire to share content with content sites of the web server 104. The policies are determined based on a set of parameters.

At block 704, the set of parameters for respective client devices 102 are identified from a policy store 110. The set of parameters may also be identified using metadata from integrations of the client devices 102. The set of parameters are stored in the policy store 110. The respective set of parameters are the user connection, the destination connection, a user application, the destination application, a source, a source location, a destination, a destination location, application type, type of connection, geographical location, residency, the data classification, data type, user groups, encryption type, and/or performance.

At block 706, the policies are compared with the set of parameters using a list of policies stored in the policy store 110. The list of policies includes policies against the set of parameters. The list of policies also includes connections for each of the policies. Based on the comparison in the list of policies, the connections for each of the policies is determined.

At block 708, a tag associated with the content to be shared is declassified. The tag includes a header and a metadata. The tag is read in order to declassify the information of the tag. For example, the tag may be confidential, secure, non-confidential, encrypted, high importance, or restricted. Based on the tag, the policies are further filtered.

At block 710, compliance of the policies with government rules and regulations is verified. It is crucial that the set of policies are in accordance with the government regulations. The administrator verifies the compliance with the government regulations.

At block 712, the policies are enforced on the respective client device 102 by the administrator. The policies are based on the set of parameters and the tag associated with the content. Communication with the web server 104 is based on the enforced policies.

At block 714, the administrator reviews log reports of the policies, and the established connections of the client devices 102. The administrator analyzes the policies and determines whether the policies require modification. In case of non-compliance with the government policies or the policies not being met at the web server 104 as determined by the mid-link server 108, the administrator may modify the set of policies depending on the case. The policies may be modified to establish connection via a secure tunnel including the HTTP/HTTPS connection when the policies are not met.

At block 716, the set of policies are modified based on the determination that the policies require updating. The policies are modified by updating or upgrading the set of policies based on the analysis. The modified policies are enforced on the respective client device 102.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A policy-controlled communication system including client devices establishing a secure session with remote instances on a web server using an encryption protocol, the policy-controlled communication system comprising:
   one or more processor devices;
   a policy component with a plurality of policies, wherein:
      a set of policies from the plurality of policies are customized for content security on a client device of a plurality of client devices,
      the set of policies are customized based on a set of parameters, the set of policies specify configuration settings of encryption protocols, and
      the set of parameters include at least one of:
   user connection, destination connection, user application, destination application, source, source location, destination, destination location, application type, data classification, data type, user groups, encryption type, performance, user's geographical location, protocol type, algorithm, threat, metadata, user and entity behavior analytics (UEBA) information, residency, and/or type of user connection;
   a local application executed on the client device is configured to:
   select a cloud service from a plurality of cloud services, wherein the cloud service being accessed from the web server;
   a mid-link server, coupled to the client device, controls web traffic for establishing connections between the client device and the web server and performs check the connections corresponding to the customized policies, the mid-link server comprising:
   a router configured to provision the set of policies for the secure session to the web server that are customized to specify the configuration setting of the encryption protocols;
   a security developer configured to determine an encryption link of a plurality of encryption links available with the web server, wherein the plurality of encryption links deliver the cloud service to the client device in accordance with the line set policies, specified for the cloud service, used to connect with the client device; and
   a linker configured to select a session protocol from a plurality of session protocols for establishing the secure session between the client device and the web server in accordance with the set of policies,
   wherein the router is further configured to establish via the encryption link the secure session of the client device with the web server based on the selected session protocol.

2. The policy-controlled communication system with the client devices establishing the secure session with the remote instances on the web server using the encryption protocol as recited in claim 1, wherein the selection of the session protocol from the plurality of session protocols to establish the secure session between the client device and the web server in accordance with the set of policies includes the linker further configured to:
   select the session protocol from the plurality of session protocols based on a remote software environment of the web server meeting the set of policies.

3. The policy-controlled communication system with the client devices establishing the secure session with the remote instances on the web server using the encryption protocol as recited in claim 1, wherein the secure session between the client device and the web server is established based on the parameters of the set of policies meeting a predetermined threshold level.

4. The policy-controlled communication system with the client devices establishing the secure session with the remote instances on the web server using the encryption protocol as recited in claim 1, wherein the session protocol from the plurality of session protocols is selected based on an upgraded or secure connection at the web server in accordance with the set of policies.

5. The policy-controlled communication system with the client devices establishing the secure session with the remote instances on the web server using the encryption protocol as recited in claim 1, wherein the content to be shared between the client device and the web server is labelled with tags, the tags are metadata associated with a type of the content, and based on the metadata, the content is classified as shareable or restricted.

6. The policy-controlled communication system with the client devices establishing the secure session with the remote instances on the web server using the encryption protocol as recited in claim 1, wherein the customization of the set of policies for the security of the content is based on an update and/or an upgrade of the encryption protocol for the secure session, and wherein the set of policies are customized by an administrator of an enterprise associated with the client device based on user group, the enterprise, or grade level in accordance with government regulations.

7. The policy-controlled communication system with the client devices establishing the secure session with the remote instances on the web server using the encryption protocol as recited in claim 1, wherein the customization of the set of policies for the security of the content on the client device with the policy component includes the local application at the client device configured to:
   compare the set of policies with the set of parameters;
   declassify a tag of the content;
   check compliance of the policies with government regulations; and
   enforce the set of policies to the client device.

8. The policy-controlled communication system with the client devices establishing the secure session with the remote instances on the web server using the encryption protocol as recited in claim 1, wherein the customization of the set of policies for the security of the content on the client device with the policy component includes:
   evaluation of log reports of the established secure session of the client device with the web server; and
   modification of the policies for the client device based on the evaluation.

9. A method for policy-controlled negotiation of an encryption protocol for a secure session between a plurality of client devices and a web server in cloud-based multi-tenant systems, the method comprising:
   customizing, based on a set of parameters, a set of policies from a plurality of policies specifying configuration setting of encryption protocols for content on a client device of the plurality of client devices having a policy component storing a plurality of policies, wherein:

the set of parameters include at least one of:

user connection, destination connection, user application, destination application, source, source location, destination, destination location, application type, data classification, data type, user groups, encryption type, performance, user's geographical location, protocol type, algorithm, threat, metadata, user and entity behavior analytics (UEBA) information, residency, and/or type of user connection;

receiving from a local application running on the client device of the plurality of client devices, selection of a cloud service from a plurality of cloud services, wherein the cloud service being accessed from the web server;

provisioning on a mid-link server between the client device and the web server that controls web traffic for establishing connection between the client device and the web server and performs check the connections corresponding to the customized policies, wherein the mid-link server comprising a router configured to provision the set of policies for the secure session to the web server that are customized to specify the configuration setting of the encryption protocols;

determining an encryption link of a plurality of encryption links available with the web server, wherein the plurality of encryption links deliver the cloud service to the client device in accordance with the the set policies, specified for the cloud service, used to connect with the client device;

selecting a session protocol from a plurality of session protocols for establishing the secure session between the client device and the web server in accordance with the set of policies; and establishing by the router via the encryption link the secure session of the client device with the web server based on the selected session protocol.

10. The method for policy-controlled negotiation of the encryption protocol for the secure session between the plurality of client devices and the web server in the cloud-based multi-tenant systems as recited in claim 9, wherein selecting the session protocol from the plurality of session protocols for establishing the secure session between the client device and the web or an application server in accordance with the set of policies includes:

selecting the session protocol from the plurality of session protocols based on a remote software environment of the web server meeting the set of policies.

11. The method for policy-controlled negotiation of the encryption protocol for the secure session between the plurality of client devices and the web server in the cloud-based multi-tenant systems as recited in claim 9, wherein establishing the secure session between the client device and the web server is based on the parameters of the set of policies meeting a predetermined threshold level.

12. The method for policy-controlled negotiation of the encryption protocol for the secure session between the plurality of client devices and the web server in the cloud-based multi-tenant systems as recited in claim 9, wherein selecting the session protocol from the plurality of session protocols is based on an upgraded or secure connection at the web server in accordance with the set of policies.

13. The method for policy-controlled negotiation of the encryption protocol for the secure session between the plurality of client devices and the web server in the cloud-based multi-tenant systems as recited in claim 9, wherein the content to be shared between the client device and the web server is labelled with tags, the tags are metadata associated with a type of the content, and based on the metadata, the content is classified as shareable or restricted.

14. The method for policy-controlled negotiation of the encryption protocol for the secure session between the plurality of client devices and the web server in the cloud-based multi-tenant systems as recited in claim 9, wherein customizing the set of policies for the security of the content is based on an update and/or an upgrade of the encryption protocol for the secure session, and wherein the policies are customized by an administrator of an enterprise associated with the client device based on user group, the enterprise, or grade level in accordance with government regulations.

15. The method for policy-controlled negotiation of the encryption protocol for the secure session between the plurality of client devices and the web server in the cloud-based multi-tenant systems as recited in claim 9, wherein customizing the set of policies for the security of the content on the client device with the policy component includes:

comparing the policies with the set of parameters;

declassifying a tag of the content;

checking compliance of the policies with government regulations;

enforcing the policies with respect to the client device;

evaluating log reports of the established secure session of the client device with the web server; and modifying the policies for the client device based on the evaluation.

16. A policy controlled communication system including client devices establishing a secure session with remote instances on a web server using an encryption protocol, the policy controlled communication system comprising:

a plurality of servers, one or more processor devices collectively having instruction code when executed for:

customizing, based on a set of parameters, a set of policies from a plurality of policies specifying configuration settings of encryption protocols for content security on a client device of a plurality of client devices having a policy component storing a plurality of policies, wherein:

the set of parameters include at least one of:

user connection, destination connection, user application, destination application, source, source location, destination, destination location, data classification, data type, user groups, encryption type, performance, user's geographical location, protocol type, algorithm, threat, metadata, user and entity behavior analytics (UEBA) information, residency, and/or type of user connection;

receiving from a local application running on the client device of the plurality of client devices, selection of a cloud service from a plurality of cloud services, wherein the cloud service being accessed from the web server;

provisioning on a mid-link server between the client device and the web server provisioning on a mid-link server between the client device and the web server that controls web traffic for establishing connections between the client device and the web server and performs check the connections corresponding to the customized policies, wherein the mid-link server comprising a router configured toe provision the set of policies for the secure sessions to the web server that are customized to specify the configuration settings of the encryption protocols;

determining an encryption link of a plurality of encryption links available with the web server, wherein the plurality of encryption links deliver the cloud service to the client device in accordance with the the set policies, specified for the cloud service, used to connect with the client device;

selecting a session protocol from a plurality of session protocols for establishing the secure session between the client device and the web server in accordance with the set of policies; and establishing by the router via the encryption link the secure session of the client device with the web server based on the selected session protocol.

17. The policy controlled communication system with the client devices establishing the secure session with the remote instances on the web server using the encryption protocol as recited in claim 16, wherein selecting the session protocol from the plurality of session protocols for establishing the secure session between the client device and the web server in accordance with the set of policies includes:

selecting the session protocol from the plurality of session protocols based on a remote software environment of the web server meeting the set of policies.

18. The policy controlled communication system with the client devices establishing the secure session with the remote instances on the web server using the encryption protocol as recited in claim 16, wherein establishing the secure session between the client device and the web server is based on the parameters of the set of policies meeting a predetermined threshold level.

19. The policy controlled communication system with the client devices establishing the secure session with the remote instances on the web server using the encryption protocol as recited in claim 16, wherein the content to be shared between the client device and the web server is labelled with tags, the tags are metadata associated with a type of the content, and based on the metadata, the content is classified as shareable or restricted.

20. The policy controlled communication system with the client devices establishing the secure session with the remote instances on the web server using the encryption protocol as recited in claim 16, wherein customizing the set of policies for the security of the content on the client device with the policy component includes:

comparing the policies with the set of parameters;

declassifying a tag of the content;

checking compliance of the policies with government regulations;

enforcing the policies with respect to the client device;

evaluating log reports of the established secure session of the client device with the web server; and modifying the policies for the client device based on the evaluation.

* * * * *